(12) United States Patent
Velner et al.

(10) Patent No.: US 9,937,741 B2
(45) Date of Patent: Apr. 10, 2018

(54) PRINT QUALITY MONITORING DEVICE FOR A COLOUR PRINTING PROCESS

(71) Applicant: HEWLETT-PACKARD INDIGO B.V., Amstelveen (NL)

(72) Inventors: Eli Velner, Nes Ziona (IL); Gilad Greenberg, Nes Ziona (IL); Bar-Navi Miki, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/326,004

(22) PCT Filed: Jul. 28, 2014

(86) PCT No.: PCT/EP2014/066204
§ 371 (c)(1),
(2) Date: Jan. 12, 2017

(87) PCT Pub. No.: WO2016/015751
PCT Pub. Date: Feb. 4, 2016

(65) Prior Publication Data
US 2017/0197448 A1    Jul. 13, 2017

(51) Int. Cl.
*B41J 29/393* (2006.01)
*B41J 2/21* (2006.01)

(52) U.S. Cl.
CPC .............. *B41J 29/393* (2013.01); *B41J 2/21* (2013.01)

(58) Field of Classification Search
CPC ........ B41J 2/473; B41J 11/0095; B41J 29/38; B41J 29/393; B41J 11/42; B41J 2/21; B41J 2/2128

(Continued)

(56) References Cited

U.S. PATENT DOCUMENTS

| 6,593,558 B1 | 7/2003 | Edgar |
| 8,422,016 B2 | 4/2013 | Picciotto et al. |
| 8,520,209 B2 | 8/2013 | Chatow et al. |

FOREIGN PATENT DOCUMENTS

| CN | 203069263 U | 7/2013 |
| DE | 102012207227 | 10/2013 |

(Continued)

OTHER PUBLICATIONS

Xu, J. et al., Real-time 3D Shape Inspection System of Automotive Parts Based on Structured Light Pattern, Feb. 2011.
(Continued)

*Primary Examiner* — Jannelle M Lebron
(74) *Attorney, Agent, or Firm* — HP Inc. Patent Department

(57) ABSTRACT

A method and system for performing color print quality monitoring for a color printing process, the method includes determining a calibration distance (ZCAL) between a Spectrophotometer (140) and an associated calibration patch (310) that provides a maximum luminescence value (LMAX) detected by the Spectrophotometer. The Spectrophotometer (140) is calibrated at the calibration distance by taking a color reading. A first color patch distance (Z1) between the Spectrophotometer and a color calibration patch (320) printed on a sheet (155) is determined from a first maximum color patch luminescence value (L1). A first color reading of the color calibration patch is taken and a second color patch distance (Z2) between the Spectrophotometer and a different area of the color calibration patch (320) is determined to provide a second maximum color patch luminescence value (L2). A second color reading of the color calibration patch is taken and compared with the first color reading to determine if the printing process needs adjusting.

19 Claims, 5 Drawing Sheets

(58) Field of Classification Search
USPC .................................... 347/14, 19, 116, 236
See application file for complete search history.

(56) References Cited

FOREIGN PATENT DOCUMENTS

| | | | |
|---|---|---|---|
| EP | 2703163 | 3/2014 | |
| EP | 2703163 A2 * | 3/2014 | .............. G01J 3/462 |
| WO | WO-2012118480 | 9/2012 | |

OTHER PUBLICATIONS

The International Bureau of WIPO, International Preliminary Report on Patentability for PCT/EP2014/066204 dated Feb. 9, 2017 (11 pages).

* cited by examiner

PRINT QUALITY MONITORING DEVICE FOR A COLOUR PRINTING PROCESS

CROSS-REFERENCE TO RELATED APPLICATION

This application is a U.S. National Stage Application of and claims priority to International Patent Application No. PCT/EP2014/066204, filed on Jul. 28, 2014, and entitled "PRINT QUALITY MONITORING DEVICE FOR A COLOUR PRINTING PROCESS," which is hereby incorporated by reference in its entirety.

BACKGROUND

When a color printing process prints patterns or any other printed matter on a continuously moving sheet supplied from a roll, the consistency of the printed colors may vary and the sheet may become creased or wrinkled. This variation is colors may be due to ambient variations or color ink/paint inconsistencies whereas the creases or wrinkles may be caused by tension variations or non-aligned roll setup. If the color consistency variations or creases are not detected and corrected during printing then the printed sheet roll may have to be scrapped.

DETAILED DESCRIPTION

Figure 1:
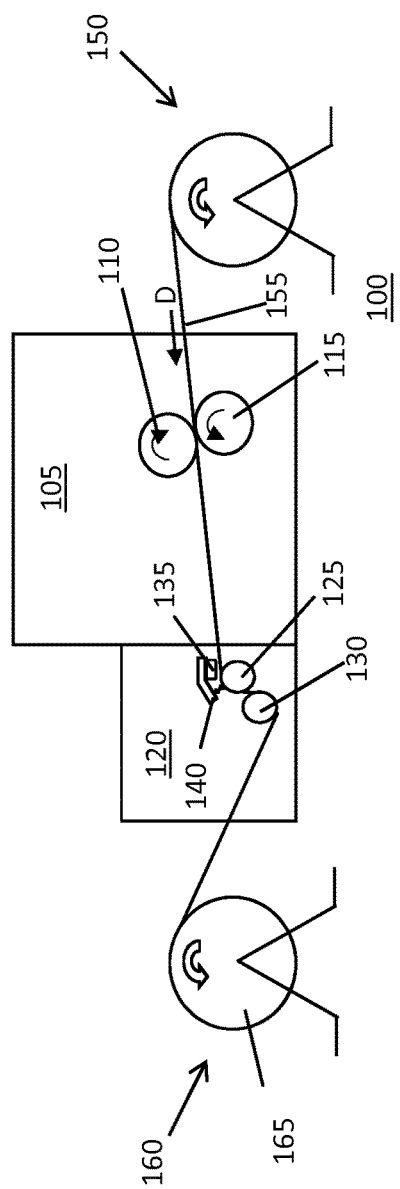
FIG. 1 is a schematic diagram illustrating an example of a side view of a color printing system that performs a color printing process.

The detailed description set forth below in connection with the appended drawings is intended to provide examples of a printing system including a printing head (module) and web moving system. At the printing module output there is a unit comprising a color measurement or monitoring module. It is to be understood that the same or equivalent functions may be accomplished by different examples. In the drawings, like numerals are used to indicate like elements throughout. Furthermore, terms "comprises," "comprising," or any other variation thereof, are intended to cover a non-exclusive inclusion and do not necessarily include only those elements listed but may include other elements not expressly listed. Also, the word color in this specification includes any color including black and white.

In one example there is provided a method for performing color print quality monitoring for a color printing process, the method comprising: determining a calibration distance between a Spectrophotometer and an associated calibration patch that provides a maximum luminescence value detected by the Spectrophotometer; and calibrating the Spectrophotometer at the calibration distance, the calibrating including taking a color reading of the calibration patch and adjusting an output response of the Spectrophotometer based on a transfer function of the Spectrophotometer to compensate for differences between the color reading and a pre-determined reference reading.

Suitably, the method may include: determining a first color patch distance between the Spectrophotometer and a color calibration patch printed on a sheet by the color printing process, the determining providing a first maximum color patch luminescence value detected by the Spectrophotometer; recording, at the first color patch distance, a first color reading of the color calibration patch taken by the Spectrophotometer; determining a second color patch distance between the Spectrophotometer and a different area of the color calibration patch, the determining providing a second maximum color patch luminescence value detected by the Spectrophotometer; recording, at the second color patch distance, a second color reading of the color calibration patch taken by the Spectrophotometer; and comparing the first color reading with the second color reading to determine if the printing process needs adjusting.

In another example there is provided a color printer system comprising a printer module for performing a color printing process and a monitoring module that includes a Spectrophotometer and an associated calibration patch, wherein the system is configured to perform operations comprising: determining a calibration distance between the Spectrophotometer and the calibration patch that provides a maximum luminescence value detected by the Spectrophotometer; calibrating the Spectrophotometer at the calibration distance, the calibrating including taking a color reading of the calibration patch and adjusting an output response of the Spectrophotometer based on a transfer function of the Spectrophotometer to compensate for differences between the color reading and a pre-determined reference reading.

Suitably, the system may also be configured perform operations comprising: determining a first color patch distance between the Spectrophotometer and a color calibration patch printed on a sheet by the color printing process, the determining providing a first maximum color patch luminescence value detected by the Spectrophotometer; recording, at the first color patch distance, a first color reading of the color calibration patch taken by the Spectrophotometer; determining a second color patch distance between the Spectrophotometer and a different area of the color calibration patch, the determining providing a second maximum color patch luminescence value detected by the Spectrophotometer; recording, at the second color patch distance, a second color reading of the color calibration patch taken by the Spectrophotometer; and comparing the first color reading with the second color reading to determine if the printing process needs adjusting.

In another example there is provided a method for performing color print quality monitoring for a color printing process, the method comprising: performing a sequence of Spectrophotometer luminescence measurements at different distances between Spectrophotometer and a calibration patch, where the maximum luminescence value detected by the Spectrophotometer defines a calibration distance; and calibrating the Spectrophotometer at the calibration distance, the calibrating including taking a color reading of the calibration patch and adjusting an output response of the Spectrophotometer based on a transfer function of the Spectrophotometer to compensate for differences between the color reading and a pre-determined reference reading.

Referring now to FIG. 1 there is shown a schematic diagram illustrating an example of a side view of a color printing system 100 that performs a color printing process (P). The system 100 includes a printer module 105 with a printing drum 110 and a sheet supporting drum 115. However, it is envisaged that other forms of printing devices may be used such as fast action printer heads. There is a monitoring module 120 that includes guiding rollers 125, 130, a track 135 and a spectrophotometer (SPM) 140 movably mounted to move along the track 135.

A supply station 150 feeds a sheet 155 in the form of a spooled roll into the printer module 105 in a direction D as indicated. The sheet 155 is fed between the printing drum 110 and a sheet supporting drum 115 and also between the guiding rollers 125, 130 of the monitoring module 120. After passing between the guiding rollers 125, 130 the sheet 155 is collected at a collection station 160 as a roll 165.

Figure 2:
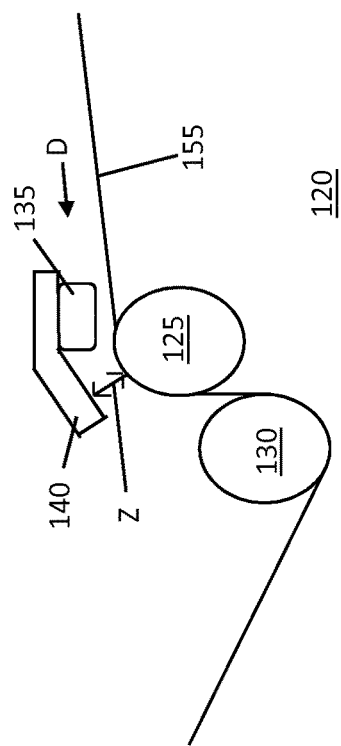
FIG. 2 is an enlarged schematic diagram illustrating an example side view of a monitoring module forming part of the printing system of FIG. 1.

Referring now to FIG. 2 there is shown an enlarged schematic diagram illustrating an example side view of the monitoring module 120. As illustrated, the height Z of the SPM can be adjusted relative to the sheet 155 and this height Z adjustment can be used for assisting in calibrating the SPM as described below.

Figure 3:
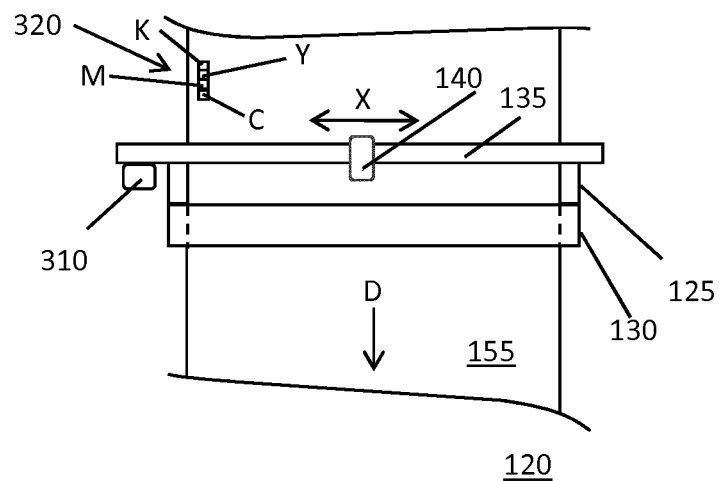
FIG. 3 is schematic diagram illustrating an example of a plan view of the monitoring module of FIG. 2.

Referring now to FIG. 3 there is shown a schematic diagram illustrating an example of a plan view of the monitoring module 120. As shown, the monitoring module 120 includes a calibration patch that is typically a ceramic white tile 310 and the SPM 140 axis of movement along the track 135 is illustrated by arrowed line X. Thus, it will be apparent that the SPM can move along the track 135 to be positioned over the ceramic white tile 310 or over the sheet 155. Also illustrated are four calibration patches 320 which are four color deposits Cyan (C), Magenta (M), Yellow (Y) and Black (K) printed on the sheet 155 by the printer module 105.

Figure 4:
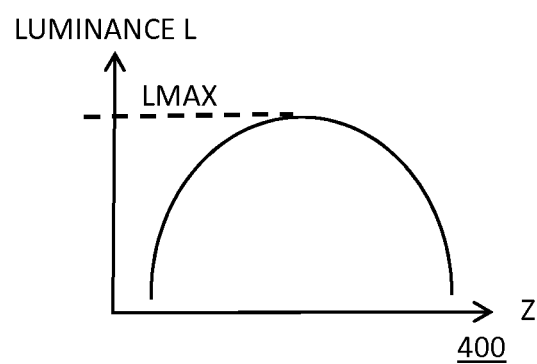
FIG. 4 a graph of showing an example Spectrophotometer (SPM) luminance detection response.

Referring now to FIG. 4 there is a graph showing an example SPM luminance detection response 400. More specifically, the response 400 shows that a maximum luminance L can be detected by adjusting the height Z of the SPM 140 from a color patch printed on the sheet 120 or from the ceramic white tile 310.

Figure 5:
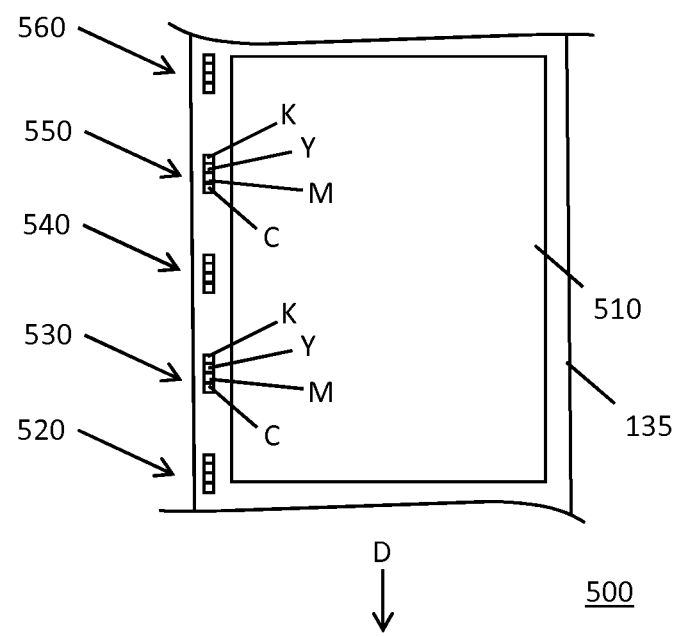
FIG. 5 is a plan view of an example of part of a printed sheet that has undergone a printing process performed by the color printing system of FIG. 1.

Referring now to FIG. 5 there is shown a plan view of an example of part of a printed sheet 500 that has undergone a printing process P performed by the color printing system 100. The printed sheet 500 is the sheet 135 that has passed through the printer module 105 in direction D. The printed sheet 500 includes a printed matter 510 and associated printed patch regions 520, 530, 540, 550 and 560 all of which were printed onto the sheet 135 by the printing process P. Also, in this example each of the printed patch regions 520, 530, 540, 550 and 560 has four patches or color deposits which are printed in the colors Cyan (C), Magenta (M), Yellow (Y) and Black (K).

Figure 6:
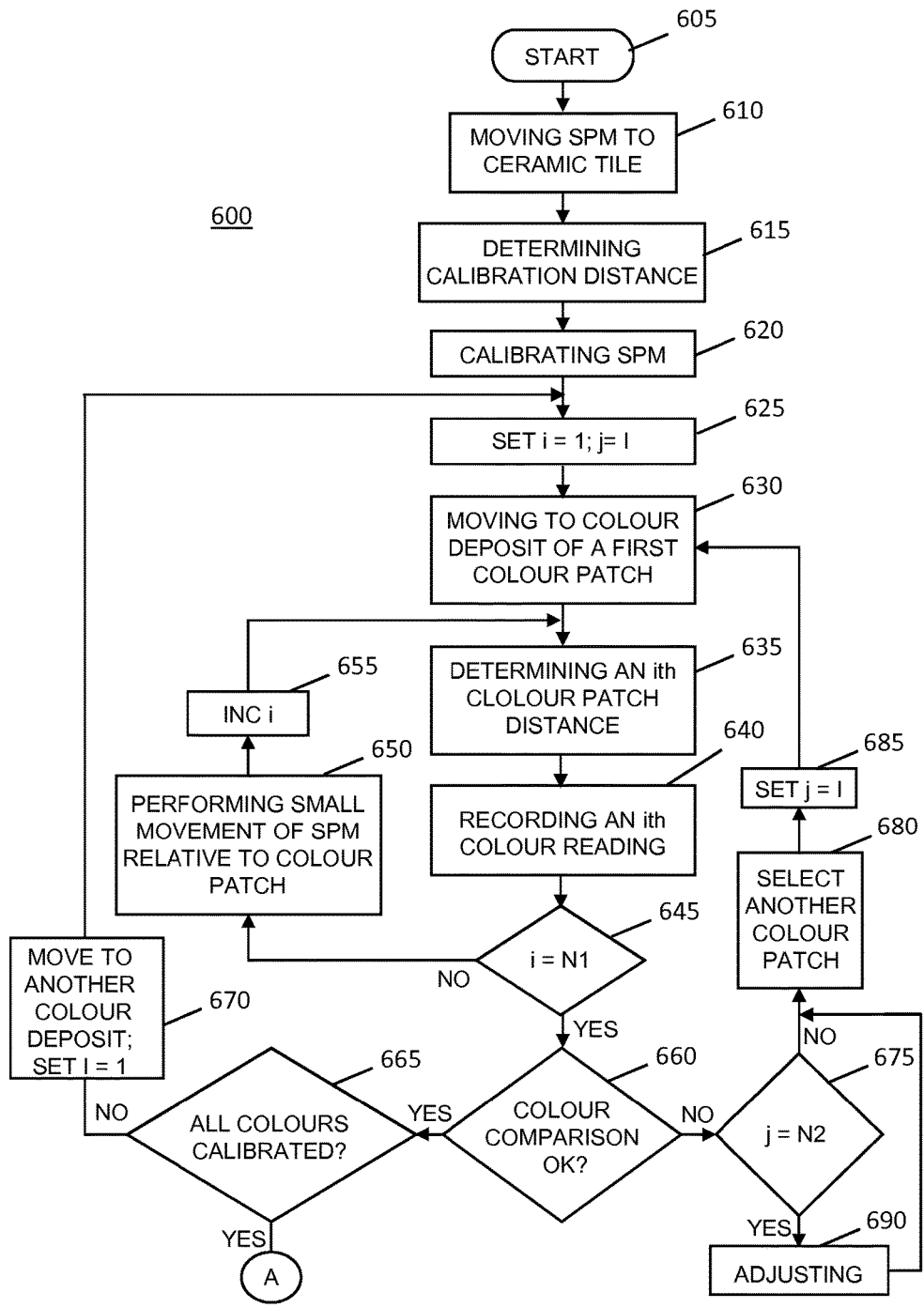
FIG. 6 is a flow chart illustrating an example of part of a method for performing color print quality monitoring.

Referring now to FIG. 6 there shown a flow chart illustrating an example of part of a method 600 for performing color print quality monitoring. The method 600 will be described with reference to the system 100, however it is to be understood that the method 600 is not limited to being performed by the system 100.

The method 600 starts at a start block 605, for instance, on power up of the system 100 or during a change of the sheet roll at the supply station 150. At a moving block 610 the SPM 140 moves along the axis of the track 135, as indicated by the arrowed line X, until it is positioned directly above the ceramic white tile 310. At a determining block 615, there is performed a process of determining a calibration distance (ZCAL) between the SPM and the ceramic white tile 310. The ceramic white tile 310 is essentially a calibration patch associated and with the specific SPM 140 that has a programmed transfer function (TF) specifically pre-set for the ceramic white tile 310. The determining of the calibration distance ZCAL is the distance of the SPM 140 from the ceramic white tile 310 that provides a maximum luminescence value LMAX detected by the SPM 140.

At a calibrating block 620 there is performed a process of calibrating the SPM 140 at the calibration distance ZCAL. The calibrating includes taking a color reading of the ceramic white tile 310 and adjusting an output response of the SPM based on the transfer function TF of the Spectrophotometer to compensate for differences between the color reading and a pre-determined reference reading (PRR). Thus, after the method 600 has completed blocks 610 to 620 the method 600 has performed a sequence of SPM luminescence measurements at different distances between SPM and a calibration patch. The maximum luminescence value detected by the SPM has defined a calibration distance which is used to calibrate the SPM. This calibration includes taking a color reading of the calibration patch and adjusting an output response of the SPM based on a transfer function of the SPM. The adjusting compensates for differences between the color reading and a pre-determined reference reading.

At a block 625 counters i and j are set to 1 and at a moving block 630 the SPM moves along the axis of the track 135, as indicated by the arrowed line X, until it is positioned directly above one of the calibration patches 320. In this regard since the Cyan (C) color deposit is the first one of the calibration patches 320 that can move in direction D under the SPM 140, the SPM 140 will be positioned firstly directly above the Cyan (C) color calibration patch 320.

At a determining block 635 there is determined a first ($i^{th}$) color patch distance (Z1) between the SPM 140 and the Cyan (C) color calibration patch 320, the determining providing a first maximum color patch luminescence value (L1) detected by the SPM 140. In this regard the first color patch distance (Z1) is determined using the expected SPM luminance detection response 400. At a recording block 640, a first color reading of the Cyan (C) color calibration patch 320 is taken by the SPM 140 at the first color patch distance Z1.

Next, at a determining block 645, it is determined if any more color recordings of a color reading of the Cyan (C) color calibration patch 320 should be taken. This decision is based on a comparison of counter i and a pre-determined value N1 which in this example is set to 2. Consequently, since counter i is not equal to N1 the method 600 moves to a block 650. At block 650 there is performed a small movement of the SPM 340 relative to the Cyan (C) color calibration patch 320. This may be performed by waiting until the sheet 155 moves in the direction D, alternatively, or in addition the SPM 140 can also move in the direction along the axis X of the track 135. At a block 655 counter i is incremented and at blocks 635 to 645 are repeated to perform determining a second ($i^{th}$) color patch distance (Z2) between the SPM 140 and the Cyan (C) color calibration patch 320, the determining providing a second maximum color patch luminescence value (L2) detected by the SPM 140. At the recording block 640, a second color reading of the Cyan (C) color calibration patch 320 is taken by the SPM 140 at the second color patch distance Z2. At the determining block 645, it is determined if any more color recordings of a color reading of the Cyan (C) color calibration patch 320 should be taken. Since counter i now equals N1, the method 600 moves to a comparing block 660. At the comparing block 660, the first color reading is compared with the second color reading to determine if the printing process P needs adjusting. The comparing determines that the printing process P does not need adjusting when the second color reading and first color reading match within the predefined tolerance (delta E) and thus define a reference color range. For example for the Cyan readings the Cyan reference color range is the modulus of the ((first color reading value—the second color reading value)/2) +/− tolerance (delta E). Similar reference color ranges can be determined for the Magenta, Yellow and Black reference color ranges. Also, when the comparing determines that the printing process does not need adjusting the second color patch distance and first color patch distance are deemed equal and thus define a Spectrophotometer to sheet monitoring distance.

If the comparison of the color readings are acceptable (identical to each other or within pre-defined tolerance ranges) the method 600, at a block 670, determines if all the four color deposits Cyan (C), Magenta (M), Yellow (Y) and Black (K) have been processed by blocks 635 to 655. If all four color deposits Cyan (C), Magenta (M), Yellow (Y) and Black (K) have not been processed then at block 670 the SPM 140 moves to another one of the color deposits and counter i is reset to 1. In this example the method waits for a short duration until the sheet has moved a short distance in direction D so that the SPM 140 is aligned above the Magenta (M) deposit. The steps 635 to 670 are repeated until all of the four color deposits Cyan (C), Magenta (M), Yellow (Y) and Black (K) have been processed by the method 600.

Returning back to the comparing block 660, if the comparison of the color readings are not acceptable a counter test at block 675 determines if this is the first occurrence (e.g. when N2 is set to 2) of an unacceptable comparison of the color readings. If it is the first occurrence the method 600 at a block 680 moves to another color calibration patch by waiting for sheet 155 to move a sufficient distance for a new group of four color deposits Cyan (C), Magenta (M), Yellow (Y) and Black (K) to be available for calibrating by the method 600. At a block 685 the counter j is reset to 1 and blocks 635 to 675 are repeated. When block 675 determines that it is not the first occurrence, a warning or alert signal is provided at a block 690 to facilitate for adjusting of the printing process P.

Figure 7:
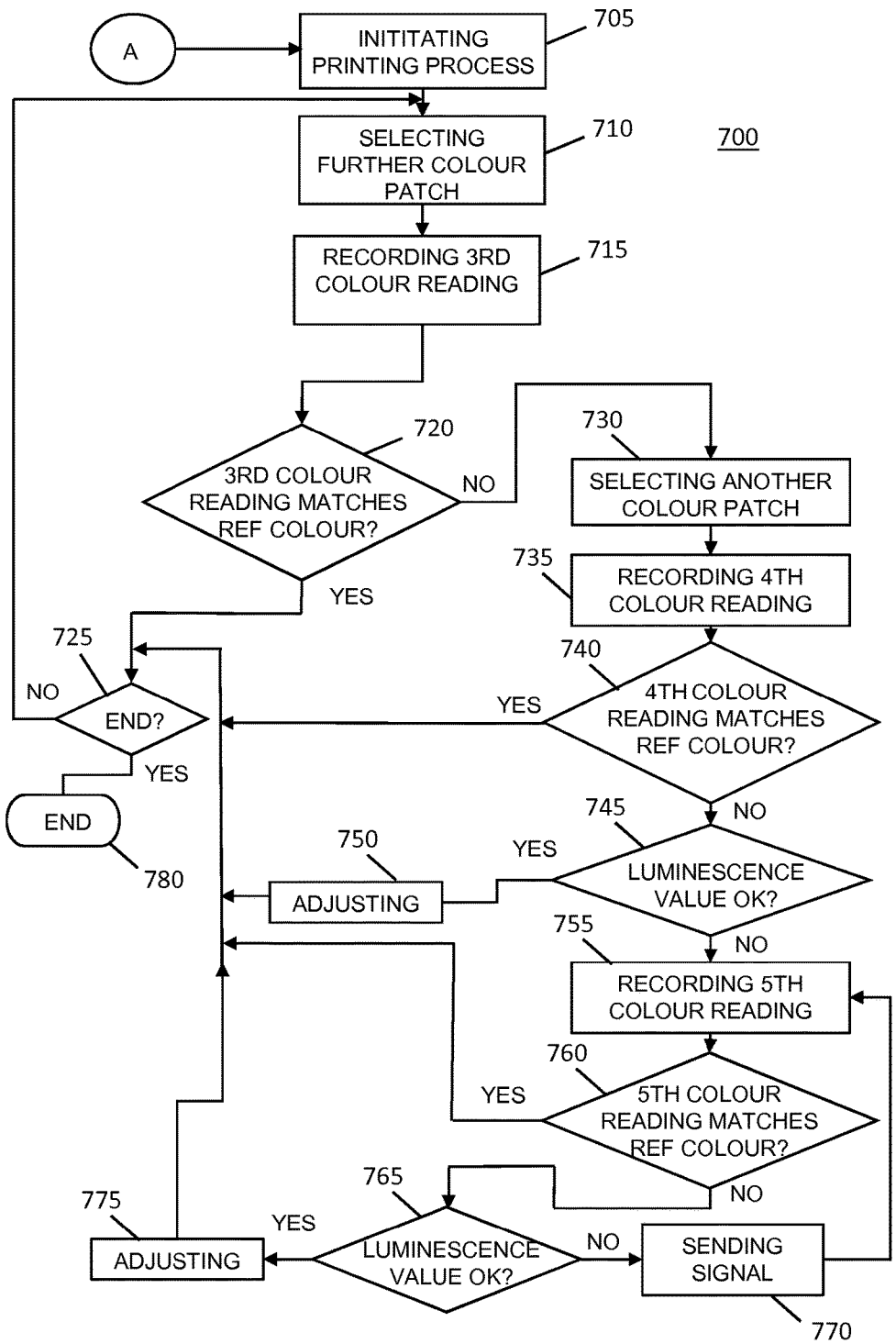
FIG. 7 is a flow chart illustrating an example of part of a method for performing color print quality monitoring.

Referring now to FIG. 7 there shown a flow chart illustrating an example of part of a method 700 for performing color print quality monitoring. The method 700 commences after the calibrating of method 600 is completed and as above the method 700 will be described with reference to the system 100, however it is to be understood that the method 700 is not limited to being performed by the system 100. At a block 705 a production run printing process PRPP is initiated by the system 100 thereby providing a printed sheet such as printed sheet 500 500 with printed patch regions 520, 530, 540, 550 and 560. At a block 710 the SPM 140 selects another color patch typically the Cyan color patch of printed patch region 520. At a block 715 there is performed a recording, at the monitoring distance from one of the further color patches, of a third color reading obtained from the SPM 140. Then, at a comparing block 720 it is determined if the third color reading with the reference color range for Cyan. If the third color reading is not outside the reference color range for Cyan the method 700, unless the printing process terminated at blocks 725 and 780, returns to block 710 where then next color patch Yellow is processed. Alternatively, if the third color reading is outside the reference color range for Cyan the method 700 goes to a block 730 where another color patch for Cyan is selected by the SPM which will be at printed patch region 530.

At a block 735, for the Cyan color patch at printed patch region 530, there is performed a process of recording, at the monitoring distance from the Cyan color patch, a fourth color reading. Then, at a block 740, the fourth color reading is compared with the with the reference color range for Cyan.

If the fourth color reading is not outside the reference color range for Cyan the method 700, unless the printing process terminated at blocks 725 and 780, returns to block 710 where then next color patch Yellow is processed. Alternatively, if the fourth color reading is outside the reference color range for Cyan the method 700 goes to a block 745 and compares a luminescence value of the Cyan color patch obtained by the SPM 140 with the first maximum color patch luminescence value. When the luminescence value of the Cyan color patch and the first maximum color patch luminescence value are similar or identical (within a pre-defined tolerance range), a signal is sent to indicate that there is a problem with the printing process at a block 750 where the signal is a warning or alert signal that is provided to facilitate for adjusting the color of the production run printing process PRPP. Then, unless the printing process is terminated at blocks 725 and 780, the method 700 returns to block 710 where then next color patch Yellow is processed.

When the luminescence value of the Cyan color patch and the first maximum color patch luminescence value are dissimilar, the method 700 at a block 755 records, at the monitoring distance from another further color patch which is typically the Cyan color patch of printed patch region 540, a fifth color reading obtained from the SPM 140. Then, at a comparing block 760 the fifth color reading is compared with the reference color range.

If the fifth color reading is not outside the reference color range for Cyan the method 700, unless terminated at blocks 725 and 780, returns to block 710 where then next color patch Yellow is processed. Alternatively, if the fifth color reading is outside the reference color range for Cyan the method 700 goes to a block 765 to compare the luminescence value of the Cyan color patch with the first maximum color patch luminescence value. When the luminescence value of the cyan color patch is different to that of the first maximum color patch luminescence value a signal (message) is sent at a block 770 to indicate that wrinkles have been detected in the printed sheet 500 and the method 700 returns to block 755 where a yet further Cyan color patch typically at printed patch region 550 is processed. Alternatively, if it is determined at block 765 that the luminescence value of the cyan color patch is similar or equal to the first maximum color patch luminescence value, a signal is sent at a block 755 to indicate that a there is a problem with the printing process. This signal is a warning or alert signal that is provided to facilitate for adjusting of the production run printing process PRPP. The method 700, unless the printing process is terminated at blocks 725 and 780, then returns to block 710 where then next color patch Yellow is processed.

As an alternative example, at block 745 if it is determined that the luminescence value of the Cyan color patch and the first maximum color patch luminescence value are dissimilar, the method 700 may move to a different location on the Cyan color patch at printed patch region 530 to make the fifth color reading as will be apparent to a person skilled in the art. In this regard the blocks 755 and 765 are performed with reference to the Cyan color patch of printed patch region 530 instead of the Cyan color patch at printed patch region 540.

The examples illustrated can provide for a simple and efficient method and system for calibrating and or performing color print quality monitoring.

The description of the examples herein has been presented for purposes of illustration and description, but is not intended to be exhaustive or limiting.

The invention claimed is:

1. A method for performing color print quality monitoring for a color printing process, the method comprising:
   determining a calibration distance between a spectrophotometer and an associated calibration patch that provides a maximum luminescence value detected by the spectrophotometer, wherein the determining of the calibration distance comprises:
      adjusting a height of the spectrophotometer relative the calibration patch to measure a plurality of luminescence values at a plurality of different heights between the spectrophotometer and the calibration patch,
      identifying the maximum luminescence value from among the plurality of luminescence values, and
      setting the calibration distance as the height, from among the plurality of different heights, at which the maximum luminescence value was measured by the spectrophotometer; and
   calibrating the spectrophotometer at the calibration distance, the calibrating including taking a color reading of the calibration patch and adjusting an output response of the spectrophotometer based on a transfer function of the spectrophotometer to compensate for differences between the color reading and a pre-determined reference reading.

2. The method as claimed in claim 1, wherein the calibration patch is separate from a sheet being printed by the color printing process, and wherein the spectrophotometer is movable in a first direction corresponding to the height between the spectrophotometer and the calibration patch, and the spectrophotometer is further movable along a track in a different second direction.

3. The method as claimed in claim 1, further comprising:
   determining a first color patch distance between the spectrophotometer and a printed color calibration patch printed on a sheet by the color printing process, the determining of the first color patch distance providing a first maximum color patch luminescence value detected by the spectrophotometer;
   recording, at the first color patch distance, a first color reading of the printed color calibration patch taken by the spectrophotometer;
   determining a second color patch distance between the spectrophotometer and a different area of the printed color calibration patch, the determining of the second color patch distance providing a second maximum color patch luminescence value detected by the spectrophotometer;
   recording, at the second color patch distance, a second color reading of the printed color calibration patch taken by the spectrophotometer; and
   comparing the first color reading with the second color reading to determine if the color printing process needs adjusting.

4. The method as claimed in claim 3, wherein the determining of the first color patch distance, the recording of the first color reading, the determining of the second color patch distance, the recording of the second color reading, and the the comparing are re-iterated for a plurality of different color patches printed on the sheet.

5. The method as claimed in claim 3, wherein in response to the comparing determining that the color printing process does not need adjusting:
   the second color patch distance and first color patch distance are deemed equal and thus define a spectrophotometer to sheet monitoring distance, and the second color reading and first color reading match within a predefined tolerance and thus define a reference color range.

6. The method as claimed in claim 5, further comprising:
   printing further color patches during the color printing process;
   recording, at the monitoring distance from one of the further color patches, a third color reading obtained from the spectrophotometer; and
   comparing the third color reading with the reference color range.

7. The method as claimed in claim 6, wherein in response to the third color reading being outside the reference color range, the method further comprises:
   recording, at the monitoring distance from another color patch, a fourth color reading obtained from the spectrophotometer; and
   comparing the fourth color reading with the reference color range.

8. The method as claimed in claim 7, wherein in response to the fourth color reading being outside the reference color range, the method further comprises comparing a luminescence value of the another color patch with the first maximum color patch luminescence value.

9. The method as claimed in claim 8, further comprising:
   in response to the luminescence value of the another color patch and the first maximum color patch luminescence value being similar or identical, sending a signal to indicate that a there is a problem with the color printing process.

10. The method as claimed in claim 8, wherein in response to the luminescence value of the another color patch and the first maximum color patch luminescence value being dissimilar, the method further comprises:
    moving to a different location on the another color patch;
    recording, at the monitoring distance from the another color patch, a fifth color reading obtained from the spectrophotometer; and
    comparing the fifth color reading with the reference color range.

11. The method as claimed in claim 8, wherein in response to the luminescence value of the another color patch and the first maximum color patch luminescence value being dissimilar, the method further comprises:
    recording, at the monitoring distance from another further color patch, a fifth color reading obtained from the spectrophotometer; and
    comparing the fifth color reading with the reference color range.

12. The method, as claimed in claim 11, wherein in response to the fifth color reading being outside the reference color range, the method further comprises:
    comparing the luminescence value of the another further color patch with the first maximum color patch luminescence value; and
    sending a signal to indicate that wrinkles have been detected in the sheet in response to the luminescence value of the another further color patch being different to that of the first maximum color patch luminescence value.

13. A color printer system comprising a printer module for performing a color printing process and a monitoring module that includes a spectrophotometer and an associated calibration patch, wherein the system is configured to:
- determine a calibration distance between the spectrophotometer and the calibration patch that provides a maximum luminescence value detected by the spectrophotometer, wherein the determining of the calibration distance comprises:
  - adjusting a height of the spectrophotometer relative the calibration patch to measure a plurality of luminescence values at a plurality of different heights between the spectrophotometer and the calibration patch,
  - identifying the maximum luminescence value from among the plurality of luminescence values, and
  - setting the calibration distance as the height, from among the plurality of different heights, at which the maximum luminescence value was measured by the spectrophotometer; and
- calibrate the spectrophotometer at the calibration distance, the calibrating including taking a color reading of the calibration patch and adjusting an output response of the spectrophotometer based on a transfer function of the spectrophotometer to compensate for differences between the color reading and a pre-determined reference reading.

14. The color printer system as claimed in claim 13, wherein the calibration patch is separate from a sheet being printed by the color printing process, and wherein the spectrophotometer is movable in a first direction corresponding to the height between the spectrophotometer and the calibration patch, and the spectrophotometer is further movable along a track in a different second direction.

15. The color printer system as claimed in claim 13, further configured to:
- determine a first color patch distance between the spectrophotometer and a printed color calibration patch printed on a sheet by the color printing process, the determining of the first color patch distance providing a first maximum color patch luminescence value detected by the spectrophotometer;
- recording, at the first color patch distance, a first color reading of the printed color calibration patch taken by the spectrophotometer;
- determining a second color patch distance between the spectrophotometer and a different area of the printed color calibration patch, the determining of the second color patch distance providing a second maximum color patch luminescence value detected by the spectrophotometer;
- recording, at the second color patch distance, a second color reading of the printed color calibration patch taken by the spectrophotometer; and
- comparing the first color reading with the second color reading to determine if the color printing process needs adjusting.

16. The system, as claimed in claim 15, wherein in response to the comparing determining that the printing process does not need adjusting:
- the second color patch distance and first color patch distance are deemed equal and thus define a spectrophotometer to sheet monitoring distance, and
- the second color reading and first color reading match within a predefined tolerance and thus define a reference color range.

17. A method for performing color print quality monitoring for a color printing process, the method comprising:
- performing a sequence of spectrophotometer luminescence measurements at different heights between a spectrophotometer and a calibration patch;
- identifying a maximum luminescence value from among a plurality of luminescence values in the spectrophotometer luminescence measurements;
- defining a calibration distance as the height, from among the different heights, at which the maximum luminescence value was measured by the spectrophotometer; and
- calibrating the spectrophotometer at the calibration distance, the calibrating including taking a color reading of the calibration patch and adjusting an output response of the spectrophotometer based on a transfer function of the spectrophotometer to compensate for differences between the color reading and a pre-determined reference reading.

18. The method of claim 17, wherein performing the sequence of spectrophotometer luminescence measurements comprises taking the luminescence measurements by the spectrophotometer at the different heights of the spectrophotometer relative to the calibration patch.

19. The method of claim 18, wherein the calibration patch is away from a sheet being printed by the color printing process.

* * * * *

UNITED STATES PATENT AND TRADEMARK OFFICE
CERTIFICATE OF CORRECTION

PATENT NO. : 9,937,741 B2
APPLICATION NO. : 15/326004
DATED : April 10, 2018
INVENTOR(S) : Eli Velner et al.

It is certified that error appears in the above-identified patent and that said Letters Patent is hereby corrected as shown below:

On the Title Page

In Column 1, Item (72), Inventors, Line 1, delete "Nes Ziona" and insert -- Ness Ziona --, therefor.

In Column 1, Item (72), Inventors, Line 2, delete "Nes Ziona" and insert -- Ness Ziona --, therefor.

In Column 1, Item (72), Inventors, Line 3, delete "Nes Ziona" and insert -- Ness Ziona --, therefor.

In the Drawings

In sheet 4 of 5, FIG. 6, reference numeral 635, Line 2, delete "CLOLOUR" and insert -- COLOUR --, therefor.

In sheet 4 of 5, FIG. 6, reference numeral 670, Line 5, delete "SET I = 1" and insert -- SET i = 1 --, therefor.

In sheet 5 of 5, FIG. 7, reference numeral 705, Line 1, delete "INITITATING" and insert -- INITIATING --, therefor.

In the Claims

In Column 7, Line 65, in Claim 4, after "reading, and" delete "the".

In Column 8, Line 36, in Claim 9, after "indicate that" delete "a".

In Column 9, Line 46, in Claim 15, delete "di stance" and insert -- distance --, therefor.

Signed and Sealed this
Ninth Day of April, 2019

Andrei Iancu
*Director of the United States Patent and Trademark Office*